United States Patent
Redshaw

(10) Patent No.: US 9,342,860 B2
(45) Date of Patent: *May 17, 2016

(54) MEMORY MANAGEMENT SYSTEM AND METHOD

(71) Applicant: Imagination Technologies, Limited, Kings Langley, Hertfordshire (GB)

(72) Inventor: Jonathan Redshaw, St. Albans (GB)

(73) Assignee: Imagination Technologies, Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/484,105

(22) Filed: Sep. 11, 2014

(65) Prior Publication Data

US 2015/0109314 A1 Apr. 23, 2015

Related U.S. Application Data

(63) Continuation of application No. 13/065,333, filed on Mar. 18, 2011, now Pat. No. 8,836,710.

(30) Foreign Application Priority Data

Mar. 19, 2010 (GB) .................................. 1004675.3

(51) Int. Cl.
*G09G 5/36* (2006.01)
*G06T 1/60* (2006.01)
*G06T 15/00* (2011.01)
*G06T 17/20* (2006.01)

(52) U.S. Cl.
CPC ................ *G06T 1/60* (2013.01); *G06T 15/005* (2013.01); *G06T 17/20* (2013.01)

(58) Field of Classification Search
CPC G06T 1/60; G06F 12/0215; G09G 2360/122; G09G 5/39
See application file for complete search history.

(56) References Cited

U.S. PATENT DOCUMENTS 6,697,063 B1 * 2/2004 Zhu ............................... 345/421
6,856,320 B1 2/2005 Rubinstein et al.
(Continued)

FOREIGN PATENT DOCUMENTS

EP 1287494 A1 3/2003
EP 1351195 A2 10/2003
(Continued)

*Primary Examiner* — Hau Nguyen
(74) *Attorney, Agent, or Firm* — Vorys, Sater, Seymour and Pease LLP; Vincent M DeLuca

(57) ABSTRACT

There is provided a method and apparatus for managing memory in a system for generating 3-dimensional computer images. The image is subdivided into a plurality of rectangular areas. A memory is provided and a page of the memory is allocated for storing object data for objects in the image. Object data for objects in the image are then written to the allocated page of memory. Finally, a bit mask for the allocated page of memory is compiled, the bit mask indicating the rectangular areas having object data stored in the allocated page of memory. A rectangular area of the image can then be rendered by deriving data for display from the object data stored in the memory, for objects in that rectangular area. Once the rectangular area has been rendered, the bit mask for each page of memory which stored, before the step of rendering, object data for that rectangular area, is updated so that the bit mask no longer indicates that rectangular area.

12 Claims, 1 Drawing Sheet

(56) References Cited

U.S. PATENT DOCUMENTS

| | | |
|---|---|---|
| 7,102,646 B1 | 9/2006 | Rubinstein et al. |
| 7,545,382 B1 | 6/2009 | Montrym et al. |
| 2002/0039100 A1 | 4/2002 | Morphet |
| 2004/0155878 A1 | 8/2004 | Inazumi |
| 2007/0132772 A1* | 6/2007 | Morphet ........................ 345/553 |
| 2008/0186318 A1 | 8/2008 | Redshaw |

FOREIGN PATENT DOCUMENTS

| | | |
|---|---|---|
| GB | 2281682 A | 3/1995 |
| GB | 2298111 A | 8/1996 |
| GB | 2343603 A | 5/2000 |
| GB | 2442266 A | 4/2008 |
| WO | 0195257 A1 | 12/2001 |
| WO | 2011114114 A1 | 9/2011 |

* cited by examiner

MEMORY MANAGEMENT SYSTEM AND METHOD

CROSS REFERENCE TO RELATED APPLICATIONS

This application is a continuation of U.S. application Ser. No. 13/065,333, filed on Mar. 18, 2011, which is incorporated by reference in its entirety herein, and which claims priority from GB 1004675.3, filed Mar. 19, 2010.

FIELD OF THE INVENTION

This invention relates to a memory management system and in particular to such a system for use in managing memory in a 3D graphics system.

BACKGROUND TO THE INVENTION

In the applicant's UK Patent No. 2281682, there is described a 3D rendering system for polygons in which each object is seen to be viewed as defined in a set of surfaces which are infinite. Each elementary area of the screen (e.g. pixel) in which an image is to be displayed has a ray projected through it from a viewpoint into the 3D scene. The location of the intersection of the projected ray with each surface is then determined. From these intersections, it is then possible to determine whether any intersected surface is visible at that elementary area. The elementary area is then shaded for display in dependence on the results of the determination. The system can be implemented in a pipeline type processor comprising a number of cells, each of which can perform an intersection calculation with a surface. Thus, a large number of surface intersections can be computed simultaneously. Each cell is loaded with a set of coefficients defining the surface for which it is to perform the intersection test.

A further arrangement is described in the applicant's UK Patent No. 2298111, in which the image is divided into sub-regions or tiles and the tiles are processed in turn. A variable tile size is used and a bounding box is projected around complete objects so that only those tiles falling within the bounding box require processing. This is done by determining the distribution of objects on the visible screen, in order for a suitable tile size to be selected. The surfaces which define the various objects are then stored in a display list, thereby avoiding the need to store identical surfaces for each tile, since one object made of many surfaces could appear in a number of tiles. Object pointers which identify the objects in the display list are also stored. There is one object pointer list per tile. The tiles can then be rendered in turn using the ray casting technique described above until all objects within each tile are processed. This is a useful method because no effort needs to be made to render objects which are known not to be visible in a particular tile.

A further arrangement is proposed in the applicant's UK Patent No. 2343603, in which any tiles within the bounding box which are not required to display a particular object are discarded before rendering.

In the existing systems described above, the processor typically includes three components. A tile accelerator unit (TA) performs the tiling operation i.e. selects a suitable tile size and divides the visible screen into tiles, and supplies the tile information i.e. the 3D object data for each tile, to the display list memory. An image synthesis processor (ISP) uses the 3D object data in the display list memory to perform the ray/surface intersection tests discussed above. This produces depth data for each elementary area of the visible screen. After this, the derived image data from the ISP is supplied to a texturing and shading processor (TSP) which applies texturing and shading data to surfaces which have been determined as visible and outputs image and shading data to a frame buffer memory. Thus, the appearance of each elementary area of the display is determined so as to represent the 3D image.

A further arrangement which is advantageous, particularly for complex scenes in which more 3D object data for each tile needs to be stored in the display list memory which results in increased storage requirements, is described in the applicant's European Patent No. 1287494. This proposes the idea of partial rendering. In EP 1287494, there is described a memory management system in which, in a tile based rendering system, blocks (pages) of memory are assigned to individual tiles for storage of object lists associated with each tile. As the 3D system determines that an object is potentially visible in a tile, data relating to that object is written to the respective object list. For complex images, the amount of data required for an object list will be greater than the size of the blocks of memory allocated to that object list. Therefore, when the amount of data stored in an object list crosses a predetermined threshold, the objects already written to the object list are rendered for that tile. Further objects may then be written to the object list until all objects have been determined to be either visible or not visible in the tile and the remaining data can be rendered (textured and shaded) ready for display.

Some objects intersect more than one tile. For these, it is usual to utilise a global object list which applies to all tiles. This contains data relating to those objects which cover a plurality of tiles and, as well as rendering data from a tile based object list for each tile, it is necessary to render data from the global tile list to determine whether or not any object is visible at any particular pixel within the tile. However, in some circumstances, the use of a global object list for an image may not be particularly efficient. This is because even for an object which intersects e.g. only two tiles, data must be written to the global object list and that processed for every tile in the screen to determine whether or not the object is visible in each tile in the screen.

Preferably, the size of the global list is reduced by associating a number of global lists with macro tiles each comprising a plurality of tiled regions on the screen, but not with the whole screen. Conventionally, memory pages are each associated with macro tiles on the screen in determining how much memory to use for a macro tile. Thus, the memory pages are managed for individual tiles within a macro tile in such a manner that, when a tile is rendered, then at least one page of memory will be freed for re-use.

SUMMARY OF THE INVENTION

The inventors of the present invention have appreciated that memory can be allocated more efficiently and that the global list can be made redundant by adopting a scheme in which macro tiles are associated with pages in memory rather than pages in memory as being associated with macro tiles. Thus, instead of a page accessing possibly two or more macro tiles, a macro tile is associated with a number of pages of memory, all of which are accessed by that macro tile. This is implemented by storing a bit mask for each page, the bits corresponding to macro tiles referred to by the entries in the page.

According to a first aspect of the invention, there is provided a method for managing memory allocation in a 3D graphics system, the method comprising the steps of: subdividing an image to be rendered into a plurality of rectangular areas; allocating an object list for each rectangular area, the object list comprising data defining objects visible in that rectangular area; dynamically allocating memory pages to each object list as the object list is compiled; storing a bit mask for each page of memory, the bit mask comprising data indicating which rectangular areas include objects having data stored in that page of memory; determining when the number of free pages of memory falls below a predetermined limit; determining which rectangular areas need to be rendered to free at least some of the pages of memory; rendering at least one rectangular area so determined; and adding any pages of memory freed by the rendering step to a free memory list.

According to the first aspect of the invention, there is also provided a method for managing memory in a system for generating 3-dimensional computer images, the method comprising the steps of: subdividing the image into a plurality of rectangular areas; providing a memory and allocating a page of the memory for storing object data for objects in the image; writing object data for objects in the image to the allocated page of memory; and compiling a bit mask for the allocated page of memory, the bit mask indicating the rectangular areas having object data stored in the allocated page of memory.

That is to say, rather than associating memory pages with rectangular areas (that is to say, allocating memory to spatial regions of the image) as in prior art arrangements, rectangular areas are associated with a number of memory pages. This redefines the handling of memory completely and avoids the need for a global list.

The step of allocating a page of memory may comprise allocating the page from a list of free pages of memory. Once the allocated page is full, the page may be added to a list of allocated pages of memory. It is preferable that, while object data is being written to the page of memory, the page does not appear in either the list of free pages of memory or the list of allocated pages of memory. Because the page is not in the list of free pages, it cannot be inadvertently re-allocated.

Preferably, the bit mask for each allocated page of memory is stored together with the address of the allocated page of memory. The bit mask for a page, which indicates which rectangular areas have object data stored in that page, can be used to determine which pages will be freed by any particular render.

The step of writing to memory object data for objects in a particular rectangular area preferably comprises compiling an object list for the particular rectangular area. Thus, once object data for all the objects in a particular rectangular area is written to memory, the object list for that rectangular area is complete.

The method may further comprise the steps of: rendering a rectangular area of the image by deriving data for display from the object data stored in the memory, for objects in that rectangular area; and for the bit mask for each page of memory which stored, before the step of rendering, object data for that rectangular area, updating the bit mask to no longer indicate that rectangular area.

That is to say, as the rectangular area is rendered, the object data is for that rectangular area is removed from the memory (because it is converted to data for display). Thus, those allocated pages which used to store object data for the rectangular area, before that rectangular area was rendered, no longer store that object data. Thus, the bit masks for those allocated pages must be updated.

Preferably, once all rectangular areas having object data stored in an allocated page of memory have been rendered, the page is added to a list of free pages of memory.

Preferably, the step of rendering a rectangular area of the image is performed once the number of free pages of memory falls below a predetermined threshold. The particular rectangular area to be rendered, for example the rectangular area which will free desired pages of the memory, can be determined from the bit masks for each memory page. Preferably, the method further comprises the step of storing information, based on the bit mask for each allocated page of memory, relating to which allocated memory page or pages will be freed when each rectangular area is rendered.

According to a second aspect of the invention, there is provided a memory management system for use with systems for generating 3-dimensional computer images, comprising: means for subdividing the image into a plurality of rectangular areas; a memory having a plurality of pages and having a page at a time allocated for storing object data for objects in the image; means for writing object data for objects in the image to an allocated page of memory; and means for compiling a bit mask for the allocated page of memory, the bit mask indicating the rectangular areas having object data stored in the allocated page of memory.

The means for subdividing the image into a plurality of rectangular areas may comprise a tiling engine. The means for writing object data for objects in the image to an allocated page of memory may comprise a compressor for constructing object data for objects in the image, or a tiling engine.

Preferably, each page of memory is allocated from a list of free pages of memory. Preferably, once a page is full, the page is added to a list of allocated pages of memory. Preferably, while object data is being written to the page of memory, the page does not appear in either the list of free pages of memory or the list of allocated pages of memory.

Preferably, the memory is arranged to store the bit mask for each allocated page. Preferably, the bit mask for each allocated page is stored together with the address of the allocated page. The bit mask for a page can then be used to determine which pages will be freed by any particular render.

The memory management system may further comprise: means for rendering rectangular areas of the image by deriving data for display from the object data stored in the memory, for objects in each rectangular area; wherein, once a particular rectangular area is rendered, the bit mask for each page of memory which stored, before rendering, object data for that rectangular area, is updated to no longer indicate that rectangular area.

According to a third aspect of the invention, there is provided a memory for use with the method of the first aspect of the invention or the system of the second aspect of the invention, the memory comprising a plurality of pages, a page being allocated at a time, for storing object data for objects in the image, and a portion for storing the bit mask for each allocated page of memory.

Features described in relation to one aspect of the invention may also be applicable to another aspect of the invention.

BRIEF DESCRIPTION OF THE DRAWINGS

A preferred embodiment of the invention will now be described in detail by way of example with reference to the accompany drawings in which.

DETAILED DESCRIPTION OF A PREFERRED EMBODIMENT

Figure 1:
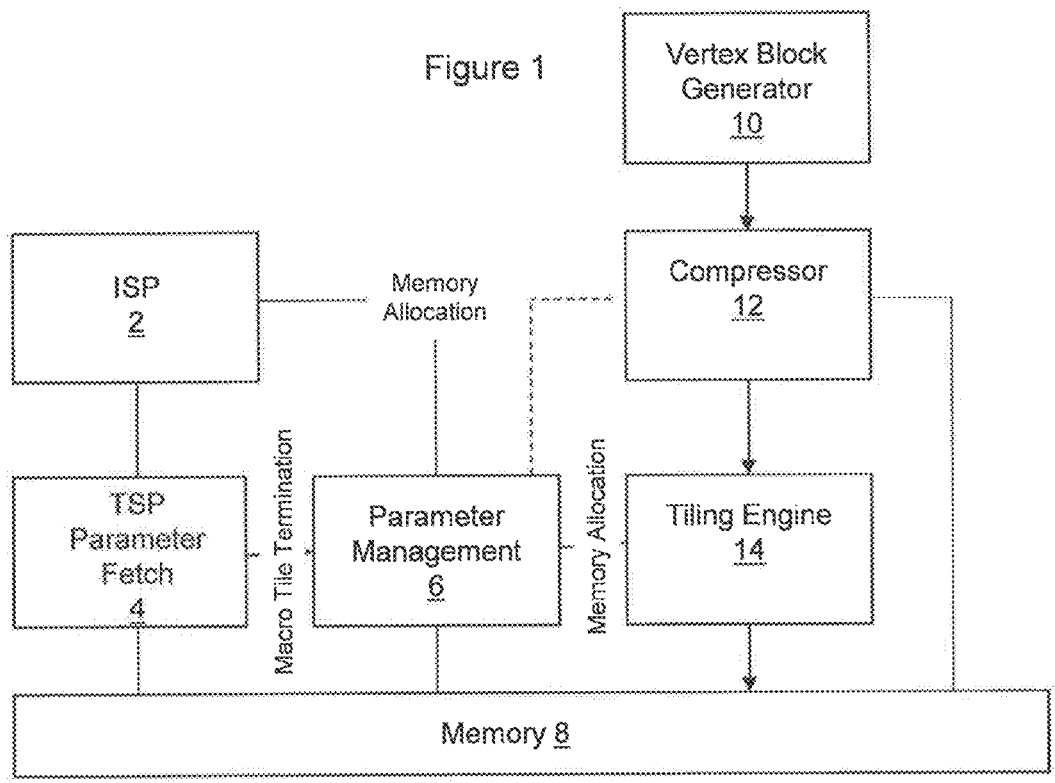
FIG. 1 shows a system diagram of a portion of a 3D graphic processing unit embodying the invention for managing memory access.

The system of FIG. 1 comprises an Image Synthesis Processor (ISP) 2 which provides data to a Texturing and Shading Processor (TSP) Parameter Fetch unit 4. Both of these are coupled to a Parameter Management unit 6. The TSP Parameter Fetch Unit 4 and the Parameter Management unit 6 are coupled to a Memory 8.

A Vertex Block Generator 10 is the source of graphics data which can be used to produce primitives such as triangles. These triangles are produced by a Compressor 12 and are then stored in Memory 8. They are also provided to a Tiling Engine 14, which is used to subdivide a scene to be textured and shaded into a plurality of rectangular areas or tiles, and which allocates triangles to tiles and ensures that they are stored in object lists for respective tiles in memory.

Typically, the Vertex Block Generator 10 produces vertex blocks of up to 64 vertices, which represent a total of up to 80 triangles ready to be written into memory. When a vertex block is complete, the Compressor 12 reads the blocks, compresses them into triangles and writes the resulting triangle data into Memory 8. In order to write to memory, the Compressor needs to have one or more memory pages allocated, in which it can store the object data defined by the triangles. Memory allocation and use of the memory will now be discussed in more detail.

A memory page is allocated for storage by issuing a memory allocation request to the Tiling Engine 14 coupled to the Compressor 12 and to the Parameter Management unit 6. The Tiling Engine 14 is used to generate object lists for the tiles, corresponding to objects which may be visible at the pixels in each respective tile.

The Tiling Engine 14 passes the request for a memory page to the Parameter Management unit 6 which acknowledges the request. The Parameter Management unit 6 sends the acknowledgement, and details of the memory page allocated, to the Compressor 12 via the dotted line in FIG. 1. The Parameter Management unit 6 sends only the acknowledgement back to the Tiling Engine 14. This indicates that a page has been allocated.

Every time a memory page is filled up with the triangle data from the Compressor 12, a request for a further new page is sent to the Parameter Management unit 6 via the Tiling Engine 14 and a new page is allocated in the same manner. Because the memory allocations go through the Tiling Engine 14, there is no denial of memory allocation to the Compressor 12. In the event that a memory request fails then the information is signalled to the Tiling Engine 14 only, but not to the Compressor 12. The Compressor does not receive a new allocation.

Once the Compressor 12 has one or more memory pages allocated to it, the Compressor can write the triangle data into those allocated memory pages of Memory 8. The objects are supplied to the Tiling Engine 14 in no particular order and the objects may therefore fall within any of the tiles. Thus the memory page being filled may contain object data for a plurality of tiles.

The Tiling Engine 14 is also capable of issuing memory allocation requests on its own behalf and receiving grant or deny responses from the Parameter Management unit 6. Once pages have been allocated to the Compressor 12 or Tiling Engine 14 for the tiles which they are currently processing, a mask is created indicating which macrotiles (groups of tiles) are referred to by the data in each memory page which has been allocated. (In an alternative embodiment the bit mask may be generated for each page related to the tiles referenced by each page rather than the macrotiles. Thus, the mask references rectangular areas comprising at least one tile, and more usually comprising a plurality of tiles.)

As the page fills, the macrotile mask fills and, when it is full, the macrotile mask is passed to the Parameter Management unit 6 along with a virtual page address for it, which it is stored in Memory 8. The Parameter Management unit 6 then has access to the macrotile mask for a page and can utilise this in determining which pages will be freed by any particular render.

It will be appreciated that the above process has two distinct stages. The first of these is the removal of a page of memory from the list of free pages. The second of these is the addition of the page to the list of allocated pages. The list of free pages and the list of allocated pages are managed by the Parameter Management unit 6. Whilst a page is being filled, it appears in neither list, but its absence from the free list prevents it from being inadvertently reallocated.

Creation of the macrotile masks will now be discussed in more detail. As already mentioned, the Tiling Engine 14 allocates triangles to tiles and ensures that they are stored in object lists for respective tiles in memory. More specifically, the Tiling Engine 14 processes triangles, and adds them into vertex blocks. Once a vertex block is built, it is written to memory, in a page or pages allocated to it by the Parameter Management unit 6. The bounding box of the vertices within the vertex block provides the macrotiles which the vertex block references. This information provides a mask of which macrotiles are being referenced in a particular page of memory. As the page fills, the macrotile mask fills. When a vertex block completes a page, the mask is complete and the mask, together with the virtual page address for it, is pipelined through the Tiling Engine 14 (i.e. where the tile lists are generated) to the Parameter Management unit 6. It is performed in this way so that the page is only passed back to the Parameter Management unit 6, after the vertex block has been tied correctly into the tile control streams Once the vertex block is prepared, the Tiling Engine 14 scans the tiles which the vertex block covers. For each tile, the Tiling Engine 14 works out which triangles are visible, and this information, together with a pointer to the vertex block, is written into a control stream for that tile. A tile list is built for every tile, and multiple tile lists can reference the same vertex block. A vertex block is only ever written once, even if it straddles multiple tiles, or macrotiles, or portions, or regions of the screen. The memory for the tile lists is allocated in 64 byte chunks, as it is required. Information about the state of each tile list and its 64 byte chunk is stored, in order to build the lists, and to know when a new chunk needs allocating. An allocation is for a specific tile, which resides in a specific macrotile. When an allocation is performed, this is done out of the current page which has been allocated by the Parameter Management unit 6 to the Tiling Engine control stream generator. As a chunk is assigned to a tile, the macrotile mask for the page is updated. When the last chunk in a page is allocated, and the tile lists have been written to memory, the virtual page address, and its macrotile mask are passed back to the Parameter Management unit 6. A page can therefore contain sections of a tile list for any tile. A tile resides within a particular macrotile.

The rendering system will require a Z buffer to be provided to manage the rendering process. This can be either an external Z buffer or an internal Z buffer. In the case where it is an external Z buffer, a small number of memory pages should be sufficient to keep the device functional as the pages are used for the various tile renderings. The exact number will be a matter for design choice depending on the complexity of the images to be processed and the page size available.

If an internal Z buffer is used, then the Z buffer is allocated from the parameter buffer. If an image has 16 macrotiles then the minimum parameter buffer size becomes dependent on the Z buffer requirement for a render. Table 1 below shows the minimum recommended parameter buffer size (Bytes) for various different screen sizes with the X and Y columns showing the number of pixels in the X and Y directions respectively. The memory requirements are shown for no Anti-Aliasing (NOAA), 2× Multi-Sample Anti-Aliasing (2×MSAA), 4× Multi-Sample Anti-Aliasing (4×MSAA) and 8× Multi-Sample Anti-Aliasing (8×MSAA). When anti-aliasing is enabled, the number of depth samples per pixel increases by the anti-aliasing factor.

TABLE 1

| X | Y | NOAA | 2xMSAA | 4xMSAA | 8xMSAA |
|---|---|---|---|---|---|
| 640 | 480 | 1795840 | 3427840 | 6691840 | 13219840 |
| 1024 | 768 | 4341760 | 8519680 | 16875520 | 33587200 |
| 1280 | 1024 | 7127040 | 14090240 | 28016640 | 55869440 |
| 1920 | 1080 | 11179840 | 22195840 | 44227840 | 88291840 |
| 2048 | 2048 | 22446080 | 44728320 | 89292800 | 178421760 |
| 8192 | 8192 | 356679680 | 713195520 | 1426227200 | 2852290560 |

When managing memory in the parameter buffer using the Parameter Management unit 6, for either an external or an internal Z buffer, the controller needs to ensure that sufficient pages are available in the system. This means that, if the list of free pages is too small before starting processing an image or part way through an image, then a render must be started. Thus, a render may be commenced when the number of free pages falls below a predetermined threshold. A table of free list entries is packed in memory in order to reduce its own memory footprint. A total of 24 bits of space are allocated, but only 20 bits are typically used to simplify the packing: bits 0-19 being for storage and bits 20-23 being the four free bits. In practice, this memory space is managed as a First-in First-Out (FIFO), which is initialised when a system is switched on. This initialisation comprises setting the read offset, the write offset, the size and base address for the entries. The fullness of the FIFO after initialisation is related to the total number of memory pages available (typically for 4 KB in size). When a memory page is allocated, its address is read from the FIFO and when a memory page is freed its address it written back to the FIFO.

Table 2 shows the typical packing of free list entries in memory in the order in which they are written to the FIFO, in an embodiment of the invention.

Allocation lists for allocated pages of memory are added to when an allocation has been completed. Pages are added to an allocation list in the Parameter Management unit 6 when allocation of data to each page completes. When a page has been allocated, the ISP 2 (see FIG. 1) records the page ID (virtual address). When the page is filled, the ISP 2 notifies the Parameter Management unit 6 that the page is full and also supplies a mask defining the macrotiles referenced within the page. The Compressor 12 and Tiling Engine 14, both of which also require pages of memory, operate in a similar manner. The manner in which pages are consumed in the system is therefore as follows:

1. A page to be allocated is received from the Parameter Management unit 6 in response to a page request.

2. The page is filled by the module which requested it (ISP 2, Compressor 12, Tiling Engine 14). As it is consumed, the module records in the page a mask of macrotiles referenced by the data within the pages the mask may be stored separately.

3. Once the page is filled, the mask is returned to the Parameter Management unit 6 along with an ID for the page (virtual page address). Once the mask is returned to the Parameter Management unit 6, the Parameter Management unit 6 performs the following actions:

4. The ID is stored, together with the mask for the page, in the page allocation list accessed by the Parameter Management unit 6.

5. Internal counters in the Parameter Management unit 6 are updated with information relating to the pages which will be freed and returned to the free list when macrotiles are rendered.

Table 3 shows the memory packing of a page allocation list in an embodiment of the invention The structure of the allocation list comprises the virtual page address and the page mask. This comprises 16 bits for the mask, 1 bit per macrotile to indicate which macrotiles are referenced, 17 bits for the data, and 6 unused bits i.e. at least 39 bits. This memory space is also stored as a FIFO and is also initialised when the system

TABLE 2

| Address | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 0x0 | P2[7:0] | | | P4 | | | P3 | | | P2 | | | P1 | | | P0 |
| 0x10 | P10[15:0] | | | | P9 | | P8 | | P7 | | P6 | | | P5[19:8] | | |
| 0x20 | P15 | | | | P14 | | P13 | | P12 | | P11 | | | P2[19:16] | | | is switched on by setting a read offset, a write offset, a base address and size. One structure is shown in Table 3.

TABLE 3

| Address | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 0x0 | D3[7:0] | | | D2 | | | | D1 | | | | D0 | | | | |
| 0x10 | D6[15:0] | | | | D5 | | | | D4 | | | | D3[39:8] | | | |

TABLE 3-continued

| Address | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 0x20 | D9[23:0] | | | D8 | | | | | D7 | | | | | D6[39:16] | | |
| 0x30 | D12[31:0] | | | | D11 | | | | D10 | | | | | D9[39:24] | | |
| 0x40 | D15 | | | | | D14 | | | | D13 | | | | D12[39:32] | | |

On commencement, there should be no data in the allocation list FIFO. When each allocation is completed, then the relevant data is written to the FIFO by the Parameter Management unit 6.

Memory de-allocation in this system occurs on a macrotile basis. When a macrotile is rendered, object data for objects in that macrotile will no longer be stored in memory, so those portions of memory can be freed (de-allocated). However, because there is no global list and the data structure has been changed, pages may be associated with multiple macrotiles and therefore more than one macrotile may need to be rendered in order to free a page of memory. Because of this, it is necessary to parse the entire list of allocated pages in order to determine which pages can be freed by particular renders.

When a macrotile has been rendered, the Parameter Management unit 6 receives a signal indicating the macrotile ID. This enables the Parameter Management unit 6 to parse the allocated page list and clear the mask bit for that macrotile in every page of memory. For each page in which the bit mask becomes empty, that page may be freed and added to the free list.

After rendering each macrotile, a parse through the allocation list is performed. For x macrotiles, this will require x parses of the macrotile list per render. For example, for a system with 16 macrotiles, this will result in 16 parses of the macrotile list per render. Parsing requests can be queued and processed together so that if two or more macrotiles finish rendering close together, then the bits relating to both of these can be cleared at the same time. When a render for the whole screen completes (and the system is typically arranged so that this happens even on partial renders) all allocated memory is freed. Thus, the parameter management unit can set the number of entries in the allocated FIFO after a render to 0.

When memory is allocated it is assigned to an allocated list. When it is de-allocated this list is referenced and used to free the memory. It is not possible to both free and allocate memory out of the same allocation list. The allocation list therefore exists twice: once for the 3D render phase (de-allocation), and once for the page allocation phase (allocation). The same list is therefore used in a different context (or function). However it cannot be used for both the allocation and de-allocation function at the same time. Therefore multiple lists are maintained. A list is built during allocation. When a render is scheduled the list is moved to the de-allocation phase. So that further allocation can be performed, a new allocation list is allocated and new allocations are added to this list.

As discussed above, the memory used for storage of depth of Z information (the Z buffer) can also be allocated from the same memory as used for other parameters. This has to be done without running out of parameter buffer memory and trying to allocate memory to the Z buffer. This is achieved by tracking the amount of free memory in the free list.

The tracking of page usage when rendering an image and the freeing of these pages can be improved by utilising some knowledge of the objects which occur in each macrotile. Preferably, objects have bounding boxes defined around them, the bounding boxes falling within a number tiles. Keeping track of the number of bounding boxes within each macrotile enables the system to keep track of how many pages of memory will be freed by rendering e.g. 1 or N macrotiles. An example of code used to implement this is shown below:

```
Let N be the number of macro tiles for a bounding box
Let B be a bounding box which contains N macro tiles
For Range(N)
    For Range(B)
        If (Mem(B) + Mem(Free) <= ZMemoryreq(N)) or (Mem(Free) <
ZMemoryreq(1))) {
            Out Of Memory;
        }
    }
}
```

Figure 2:
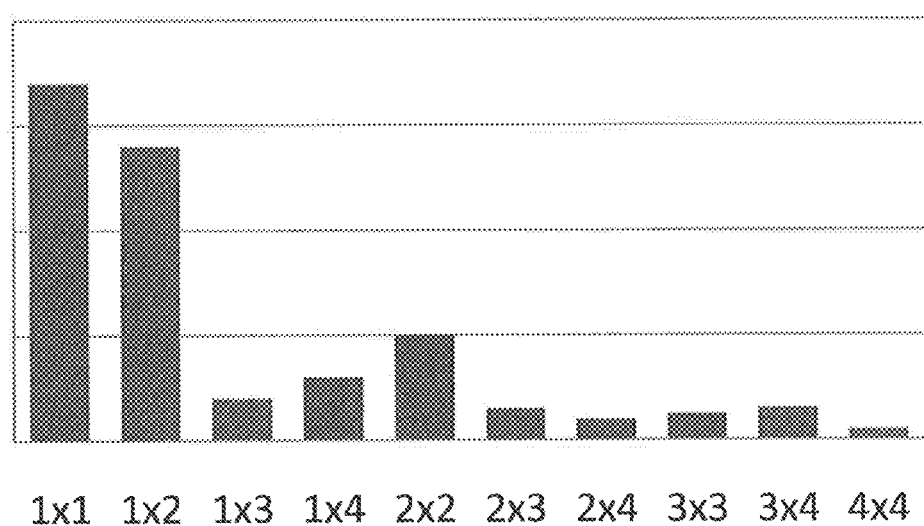
FIG. 2 shows a chart illustrating the percentage of pages referred by macro tiles for different bounding box sizes.

If every possible order of macrotiles were considered, there would be an exceptionally large number of page counts to maintain. However, using the example above, by determining the spatial locality of macrotile usage, the actual distributions of macrotiles which occur in some scenes can be maintained. FIG. 2 shows a chart illustrating the percentage of pages referenced by macrotiles for different bounding box sizes. In FIG. 2, the bounding box sizes (x by y) are shown on the x-axis and the percentage of pages is shown on the y-axis.

A number of different bounding boxes may be defined for macro tiles and these are shown in Table 4 below. The bounding box N is shown in the left hand column of Table 4. As can be seen, these comprise a range from 16 1×1 macro tiles to a single 4×4 bounding box macro tile covering the whole image. The number of boundings or counters B used by these bounding boxes is shown in the right hand column of Table 4. Each counter needs to be capable of holding all the memory pages. Therefore, with a 4 GByte range of 16 KByte pages, each counter will require 18 bits.

TABLE 4

| Bounding Box (N Macro tiles) | Number of Boundings or Counters (B) |
|---|---|
| 1 × 1 | 16 |
| 1 × 2 | 16 |
| 1 × 4 | 8 |
| 2 × 2 | 9 |
| 2 × 4 | 6 |
| 3 × 3 | 4 |
| 4 × 4 | 1 |
| Total | 60 |

In the system described above, all memory allocations come primarily from the Tiling Engine 14. Consequently out-of-memory events are handled by the Tiling Engine 14. The Compressor 12 and ISP 2 do not have knowledge of out-of-memory events.

If an out-of-memory event occurs, the Parameter Management unit 6 will immediately prevent memory allocation in response to requests from the Tiling Engine 14. This will terminate the continued tiling of data. The Parameter Management unit 6 will then generate a macrotile array in memory defining the macrotiles required to be rendered to free some memory, together with the starting address for each macrotile. These will then be rendered and memory freed. The number of macrotiles rendered will be dependent on the image data already tiled.

At this point, three options are possible. Firstly, a partial render of the full scene can be performed using all of the macrotiles. This will free up memory. Alternatively, a context switch can be performed which allows other renders to be run to either free resources or resolve render dependencies, for example synchronization. The other option is to grow the parameter buffer by allocating memory from elsewhere. This will allow allocation to continue but, in many situations this will not be possible.

It will be appreciated from the above that the system and method of the invention enable memory to be allocated and freed efficiently in a system which does not require a global list for objects covering more than one tile or macrotile. This is achieved by using a mask of macrotiles referenced by each page of memory. Therefore, the Parameter Management unit can determine which renders will free up which particular pages of memory and can manage the rendering process efficiently to ensure that there is always adequate memory space in which to write object data.

The invention claimed is:

1. A method for managing memory allocation in a 3D graphics system, the method comprising:
receiving data for objects to be rendered in order to produce an image;
allocating memory pages for storing respective portions of the received data defining the objects to be rendered;
storing portions of the received data in the allocated memory pages;
compiling a list for each rectangular area of a plurality of rectangular areas of pixels that collectively define the image to be produced, said list referencing locations within the memory pages that store data defining objects that overlap that rectangular area;
storing a mask for each page of memory comprising data indicating all the rectangular areas that are overlapped by objects for which data is stored in that page of memory;
rendering all of the rectangular areas which are indicated by a mask that is associated with a memory page as having object data stored in that memory page; and
adding, after accessing the object data from that memory page, that memory page to a free page list identifying a number of free pages of memory, if said number of free pages of memory is to be increased.

2. The method according to claim 1, wherein the allocating of pages of memory comprises allocating the pages from the free page list.

3. The method according to claim 1, further comprising adding a reference to an allocated memory page to a list of allocated memory pages.

4. The method according to claim 1, further comprising storing the mask for each allocated page of memory together with an address of that allocated page of memory.

5. The method according to claim 1, wherein the compiling a list for each rectangular area comprises compiling a separate list for each rectangular area.

6. The method according to claim 1, further comprising updating the mask associated with the memory page indicated by the mask to no longer indicate any rectangular area that was rendered.

7. The method according to claim 1, further comprising determining that a number of free pages of memory pages is to be increased by determining that a number of free pages of memory is below a threshold.

8. The method according to claim 1, further comprising storing information, based on the bit mask for each allocated page of memory, relating to which allocated memory page or pages will be freed when each rectangular area is rendered.

9. A graphics system, comprising:
a tiling engine configured to subdivide an image to be rendered into a plurality of rectangular areas;
a memory divided into a plurality of pages and having a page at a time allocated for storing object data for objects in the image; and
a tiling engine configured to write object data for objects overlapping one or more of the rectangular areas, and to compile a bit mask for the allocated page of memory,
the bit mask indicating all of the rectangular areas overlapped by objects for which object data was stored in that allocated page of memory.

10. The graphics system of claim 9, further comprising:
an image synthesis processor configured to render rectangular areas of the image by deriving data for display from the object data stored in the memory, for objects in each rectangular area,
wherein, once a particular rectangular area is rendered, the bit mask for each page of memory which stored, before rendering, object data for that rectangular area, is updated to no longer indicate that rectangular area.

11. The graphics system of claim 10, wherein a memory subsystem is configured, responsive to the bitmask indicating that all of the rectangular areas overlapped by object data in the page of memory associated with that bitmask have been rendered, to add that page of memory to a free page list.

12. A method for managing memory allocation in a 3D graphics system, the method comprising:
receiving data defining objects to be rendered in order to produce an image;
allocating memory pages to store the received data;
tiling the objects defined by the received data according to how the objects overlap a plurality of rectangular areas of pixels that collectively define the image to be produced;
tracking, for each of the plurality of rectangular areas, which memory page stores data for an object overlapping that rectangular area;
producing a mask, for each memory page, which identifies all of the rectangular areas that are overlapped by an object defined by data stored in that memory page;
rendering a rectangular area, comprising accessing the memory pages that were tracked as storing data for objects overlapping that rectangular area;
responsive to the rendering of the rectangular area, updating each mask that identifies the rendered rectangular area to no longer identify the rendered rectangular area; and
responsive to a mask for a memory page no longer identifying any rectangular area, adding that memory page to a free list of memory pages.

* * * * *